United States Patent [19]
Osada et al.

[11] Patent Number: 5,230,549
[45] Date of Patent: Jul. 27, 1993

[54] MOTOR VEHICLE BRAKE SYSTEM WITH ADAPTIVE BRAKING FORCE CONTROL

[75] Inventors: Yasuhide Osada; Yasuhiko Fujita, both of Tochigi, Japan

[73] Assignee: Honda Giken Kogyo Kabushiki Kaisha, Tokyo, Japan

[21] Appl. No.: 790,979

[22] Filed: Nov. 13, 1991

[30] Foreign Application Priority Data

Nov. 13, 1990 [JP] Japan .................. 2-306425

[51] Int. Cl.⁵ .............................................. B60T 13/74
[52] U.S. Cl. ........................................ 303/3; 303/20; 303/113.4
[58] Field of Search ............... 303/3, 15, 20, 113.55; 188/156, 159, 157, 161, 162, 163

[56] References Cited

U.S. PATENT DOCUMENTS

| | | | |
|---|---|---|---|
| 3,802,745 | 4/1974 | Strifler | 303/20 |
| 4,327,414 | 4/1982 | Klein | 303/20 |
| 4,602,702 | 7/1986 | Ohta | 303/20 |
| 4,658,939 | 4/1987 | Kircher et al. | 188/156 |
| 4,787,442 | 11/1988 | Petersen | 303/3 |
| 4,802,562 | 2/1984 | Kuroyanagi et al. | 303/20 |

FOREIGN PATENT DOCUMENTS

| | | | |
|---|---|---|---|
| 0118557 | 7/1984 | Japan | 303/20 |
| 0118558 | 7/1984 | Japan | 303/20 |
| 60-206766 | 10/1985 | Japan | |

*Primary Examiner*—Matthew C. Graham
*Attorney, Agent, or Firm*—Armstrong, Westerman, Hattori, McLeland & Naughton

[57] ABSTRACT

A motor vehicle brake system has braking force generating mechanisms mechanically separate from a brake pedal and controllable to impart braking forces to road wheels in response to detected depression of the brake pedal. The brake system has a sensor for detecting a displacement of the brake pedal and a sensor for detecting a force applied to the brake pedal. The braking force generating mechanisms are controlled by a controller based on the detected displacement of the brake pedal and the detected force applied to the brake pedal.

9 Claims, 6 Drawing Sheets

MOTOR VEHICLE BRAKE SYSTEM WITH ADAPTIVE BRAKING FORCE CONTROL

BACKGROUND OF THE INVENTION

1. Field of the Invention

The present invention relates to a brake system for use on motor vehicles, and more particularly to a brake system including braking force generating mechanisms mechanically separate from a brake pedal, for applying braking forces to road wheels based on selected different parameters of depression by the driver of the brake pedal.

2. Description of the Relevant Art

Electronic brake systems include braking force generating mechanisms mechanically separate from a brake pedal, for applying braking forces to road wheels of a motor vehicle in response to depression of the brake pedal by the driver. Such electric brake systems have a sensor for detecting the depression by the driver of the brake pedal. In response to a signal from the sensor, electric actuators of the braking force generating mechanisms are energized to apply boosted braking forces to the road wheels.

One known motor vehicle brake apparatus is disclosed in Japanese Laid-Open Patent Publication No. 60-206766 (corresponding to U.S. Pat. No. 4,658,939), for example. The disclosed motor vehicle brake apparatus tends to make the driver feel awkward because it controls the braking forces based on either depressing forces applied to the brake pedal by the driver or a stroke by which the brake pedal is depressed by the driver. More specifically, the ordinary driver of motor vehicles with usual mechanical brake systems adjusts the braking forces by varying the stroke of depression of the brake pedal when the motor vehicle is to be braked with relatively small deceleration in normal traffic conditions, and also adjusts the braking forces by varying the depressing forces applied to the brake pedal when the motor vehicle is to be braked with relatively large deceleration in case of emergency. Since the driver adjusts the braking forces in these different modes depending on the traffic situation, the driver is unable to get natural responses that match the driver's feel if the braking forces are controlled based on either the depressing forces on the brake pedal or the depressing stroke of the brake pedal.

SUMMARY OF THE INVENTION

It is an object of the present invention to provide an electric brake system for a motor vehicle, which has braking force generating mechanisms mechanically separate from a brake pedal, for imparting braking forces to road wheels, the electric brake system being arranged to give the driver responses that make the driver feel natural when the driver brakes the motor vehicle.

According to the present invention, there is provided a brake system for imparting braking forces to road a wheels of a motor vehicle, comprising braking command producing means, operable by the driver of the motor vehicle, for producing a braking command to brake the motor vehicle, the braking command comprising a displacement of the braking command producing means and a force applied to the braking command producing means, detecting means for detecting the displacement of and the force applied to the braking command producing means and generating a signal representing the displacement and the force, braking force generating means for imparting braking forces to the road wheels of the motor vehicle, the braking force generating means being mechanically separate from the braking command means, and control means for controlling the braking force generating means based on the signal from the detecting means.

In a preferred embodiment, the control means controls the braking force generating means based on the displacement if the displacement is of a predetermined value or less, and controls the braking force generating means based on the force if the displacement is larger than the predetermined value.

In another preferred embodiment, the brake system further includes a deceleration sensor for detecting a deceleration of the motor vehicle, and the control means controls the braking force generating means based on the displacement if the deceleration is of a predetermined value or less, and controls the braking force generating means based on the force applied to the brake pedal if the deceleration is larger than the predetermined value.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
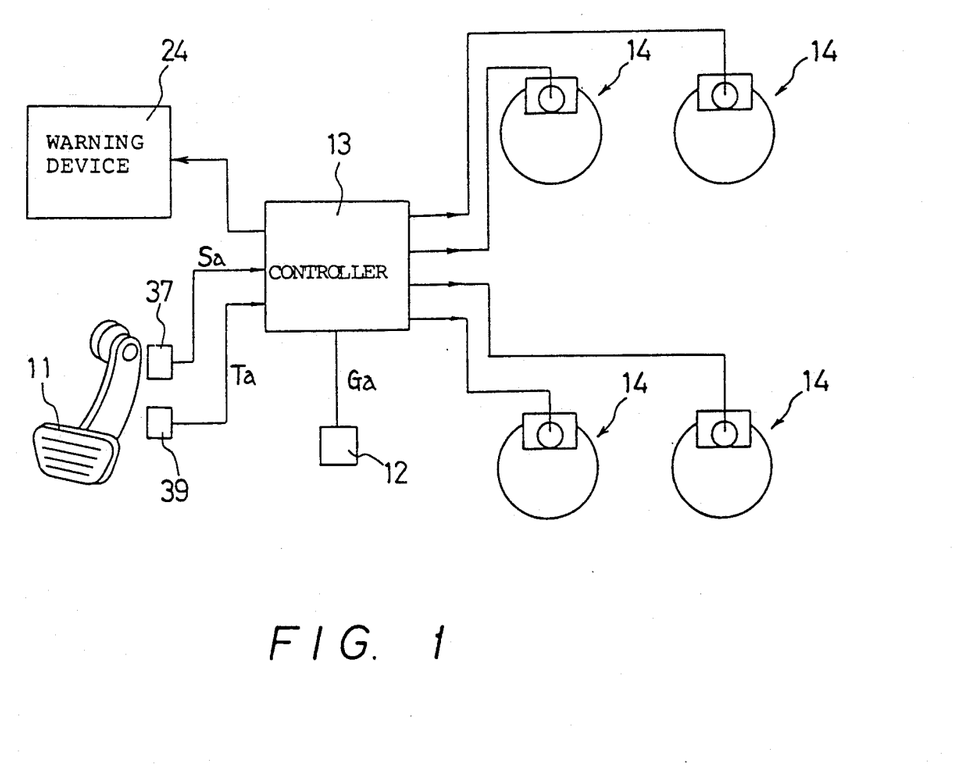
FIG. 1 is a schematic diagram, partly in block form, an electric brake system for a motor vehicle according to the present invention.

FIG. 1 schematically shows an electric brake system according to the present invention, the electric brake system being incorporated in a motor vehicle. The motor vehicle has a brake pedal 11 that is angularly movably supported on a vehicle frame (not shown) of the motor vehicle in front of the driver's seat. The brake pedal 11 serves as a braking command producing means for producing a braking command to brake the motor vehicle.

The electric brake system includes a brake stroke sensor 37 and a depressing force sensor 39 associated with the brake pedal 11. The brake stroke sensor 37 and the depressing force sensor 39 serve as a brake operation detecting means for detecting operation of the brake pedal 11, indicative of the braking command. More specifically, the brake stroke sensor 37 detects the stroke Sa by which the brake pedal 11 is depressed, and applies a stroke signal indicative of the detected stroke Sa to a controller 13. The depressing force sensor 39 detects the depressing force Ta imposed on the brake pedal 11 by the driver, and applies a depressing force signal indicative of the detected depressing force Ta to the controller 13.

When the running motor vehicle is decelerated, its deceleration Ga is detected by a deceleration sensor 12, which applies a deceleration signal indicative of the detected deceleration Ga to the controller 13.

The electric brake system also includes four braking force generating mechanisms 14 associated respectively with front left, front right, rear left, and rear right road wheels of the motor vehicle. The braking force generating mechanisms 14 are mechanically separate from the brake pedal 11 and operable independently of each other. Each of the braking force generating mechanisms comprises a disc rotatable in unison win the road wheel, pads movable into frictional contact with the disc, and an electric actuator such as an electric motor for pressing the pads against the disc. The electric motor is energizable by a drive signal from the controller 13.

The electric brake system has a warning device 24 which is energized by a signal from the controller 13 when any one of the braking force generating mechanisms 14 or the controller 13 malfunctions, to give the driver a warning in the form of a voice and/or energized lamp.

The stroke sensor 37, the depressing force sensor 39, the deceleration sensor 12, the warning device 24, and the braking force generating mechanisms 14 are electrically connected to the controller 13. The controller 13 comprises a microcomputer or the like, and processes detected signals from the stroke sensor 38, the depressing force sensor 39, and the deceleration sensor 12 to control the energization of the electric motors of the braking force generating mechanisms 14.

Figure 2:
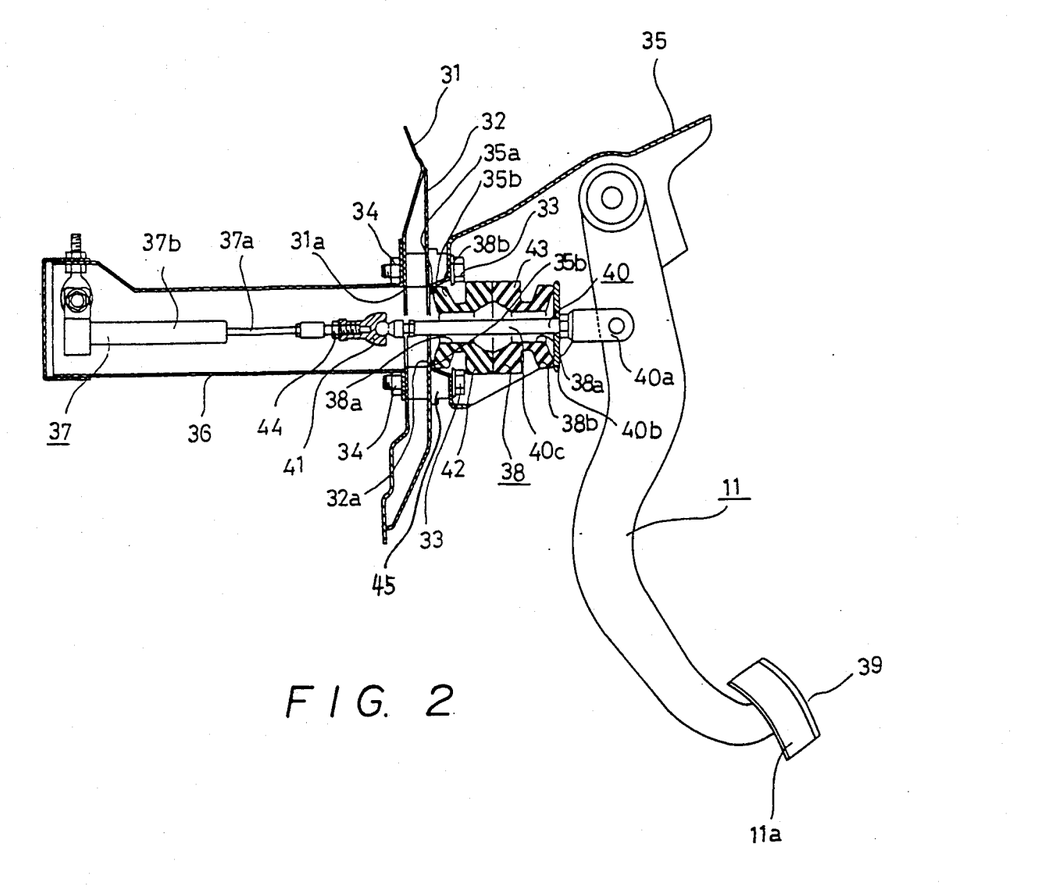
FIG. 2 is a brake pedal mechanism and a brake pedal depression detecting mechanism of the electric brake system shown in FIG. 1.

A brake pedal mechanism and a brake pedal depression detecting mechanism of the electric brake system will be described below with reference to FIG. 2.

A stiffener 31 is attached to a motor vehicle body (not shown), and an attachment plate 32 is joined to the stiffener 31, the attachment plate 32 having a portion spaced from the stiffener 31. The stiffener 31 and the attachment plate 32 has respective insertion holes 31a, 32a defined respectively therein, the insertion holes 31a, 32a having substantially equal diameters. A bracket 35 is mounted on the attachment plate 32 and the stiffener 31 by bolts 33 and nuts 34 through an attachment member 45.

A tubular casing 36 with a closed end and an open end is attached to the stiffener 31 with the open end registered with the insertion hole 31a. The tubular casing 36 houses therein the stroke sensor 37 and a shackle 41.

A bracket 35 has an insertion hole 35a defined in a proximal end thereof and having a diameter substantially the same as that of the insertion hole 32a of the attachment plate 32. The bracket 35 has an annular retainer 35b extending around the insertion hole 35a as a tapered wall.

The brake pedal 11 has an upper end angularly movably coupled to an upper portion of the bracket 35 and supports a treadle 11a on its lower end. The treadle 11a is associated with the depressing force sensor 39, which a pressure-sensitive member of rubber for detecting a depressing force Ta applied to the brake pedal 11 and producing a signal representing the applied depressing force Ta.

The brake pedal 11 is operatively connected to the shackle 41 by a connecting rod 40. The connecting rod 40 comprises a rod member 40c, a bifurcated joint 40a coupled to one end of the rod member 40c, and a flange 40b fixed to the joint 40a. The joint 40a is pivotally connected to an upper portion of the brake pedal 11. The rod member 40c extends loosely through the insertion holes 31a, 32a, 35a, and has the opposite end coupled to the shackle 41 that is joined to a detecting rod 37a of the stroke sensor 37.

An elastomeric block 38 of an elastic material such as rubber comprises a pair of hollow circular bushings 42, 43 interposed between the flange 40b and the retainer 35b. The bushings 42, 43 have respective insertion holes 38a defined therein and including tapered surfaces, with the connecting rod 40 extending axially through the insertion holes 38a. The bushings 42, 43 have respective annular ridges 38b on their outer circumferential surfaces at their outer ends. The bushings 42, 43 are coaxially aligned with each other and have respective larger-diameter ends remote from the annular ridges 38b and engaging each other. The annular ridges 38b are held against the flange 40b and the retainer 35b, respectively.

The shackle 41 has an end pivotally coupled to the end of the connecting rod 40 remote from the joint 40a. The opposite end of the shackle 41 is threaded over an externally threaded end of the detecting rod 37a and fastened thereto by a locknut 44. The connecting rod 40 and the detecting rod 37a can be positionally adjusted relatively to each other when the length of the shackle 41 threaded over the detecting rod 37a is varied.

The stroke sensor 37 includes a body 37b fixedly mounted in the casing 36, with the detecting rod 37a being mounted in the body 37b for movement into and out of the body 37b. The stroke sensor 37 detects the stroke Sa by which the brake pedal 11 is depressed by the driver, based on the position of the detecting rod 37a with respect to the body 37b, i.e., based on the length of the detecting rod 37a that extends out of the body 37b, and produces a signal representing the detected stroke Sa.

When the brake pedal 11 is depressed by the driver, the elastomeric block 38 between the flange 40b and the retainer 35b is elastically deformed, applying a reactive force back to the brake pedal 11.

Figure 4:
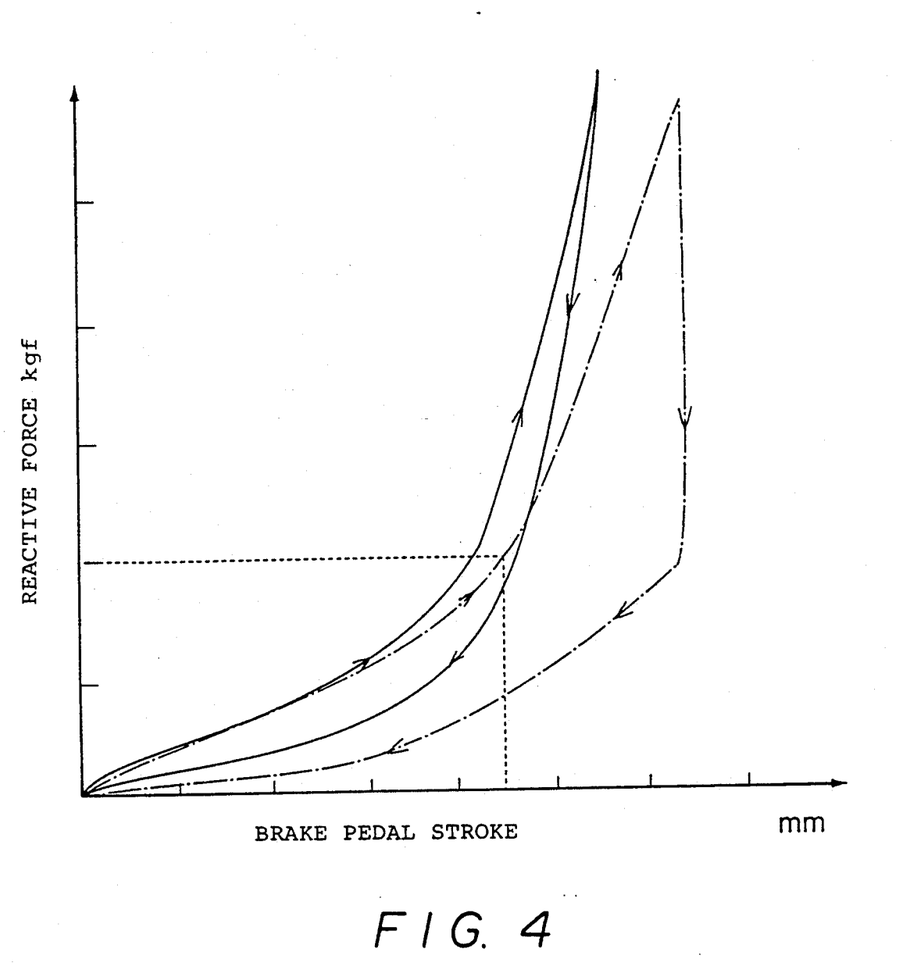
FIG. 4 is a diagram of reactive forces produced by a brake pedal.

The reactive force that is elastically produced by the elastomeric block 38 increases progressively along the solid-line quadratic curve shown in FIG. 4 as the stroke of depression of the brake pedal 11 increases. The reactive force that is generated by the elastomeric block 38 when the brake pedal 11 is depressed is greater than the reactive force that is generated when the brake pedal 11 is released, thus providing a hysteresis characteristic curve that is analogous to the characteristic curve (indicated by the dot-and-dash lines in FIG. 4) of an ordinary hydraulically Operated brake system. Therefore, when the brake pedal 11 is depressed, it gives the driver a reactive force similar to the reactive force which is generated when the conventional hydraulically operated brake system is operated on. The electric brake system thus makes the driver, who is accustomed to the responses of the ordinary hydraulically operated brake system, feel natural when the driver gets the reactive force from the brake pedal 11 depressed by the driver. A rectangular area indicated by the broken line in FIG. 4 indicates a normal range of strokes vs. reactive forces, which is usually used when the brake pedal 11 is depressed.

The reactive characteristics of the elastomeric block 38 can easily be varied when its material (modulus of elasticity) and configuration are changed. Consequently, the brake pedal mechanism shown in FIG. 2 may be adapted easily to different types of motor vehicle and hence is highly versatile.

Operation of the electric brake system according to the above embodiment will be described below.

When the brake pedal 11 is depressed by the driver, the depression of the brake pedal 11 is detected by the stroke sensor 37 and the depressing force sensor 39. More specifically, the stroke sensor 37 produces a stroke signal indicative of the stroke Sa by which the brake pedal 11 is depressed, and the depressing force sensor 39 produces a depressing force signal indicative of the depressing force Ta applied to the brake pedal 11 by the driver.

Figure 3:
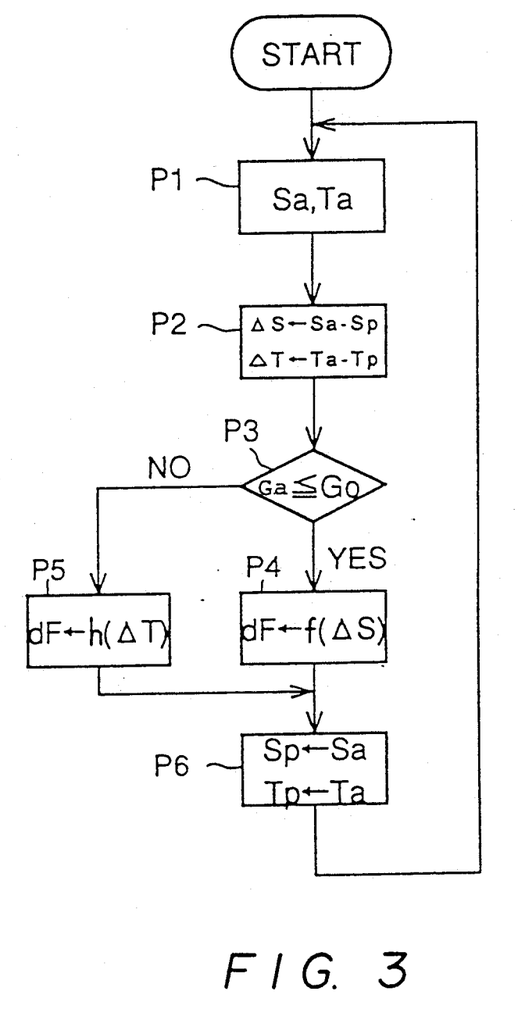
FIG. 3 is a flowchart of a control sequence of the electric brake system.

Based on the stroke and depressing force signals supplied to the controller 13, the controller 13 repeatedly carries out a control sequence shown in FIG. 3 to control braking forces generated by the braking force generating mechanisms 14.

As shown in FIG. 3, the controller 13 reads the stroke Sa and the depressing force Ta from the stroke sensor 37 and the depressing force sensor 39 in a step P1. Then, the controller 13 calculates a change $\Delta S$ ($=Sa-Sp$) in the stroke and a change $\Delta T$ ($=Ta-Tp$) in the depressing force in a step P2, where Sp, Tp are values of the stroke and the depressing force stored in a step P6 of a previous routine cycle. The controller 13 thereafter determines whether or not the deceleration Ga read from the deceleration sensor 12 is of a predetermined value Go ($=0.6$, for example) or less. If the deceleration Ga is of the value Go or less, then control goes to a step P4. In the step P4, the controller 13 calculates a target change dF ($=f(\Delta S)$) in the braking force as a function f of the stroke change $\Delta S$, and controls the braking force generating mechanisms 14 so that the braking forces generated thereby change by the target change dF.

If the deceleration Ga is larger than the value Go, then control goes to a step P5. In the step P5, the controller 13 calculates a target change dF ($=h(\Delta S)$) in the braking force as a function h of the depressing force change $\Delta T$, and controls the braking force generating mechanisms 14 so that the braking forces generated thereby change by the target change dF.

Finally, the controller 13 stores the present stroke Sa and depressing force Ta for a next routine cycle.

In this embodiment, if the deceleration Ga is relatively small, the braking force generating mechanisms 14 generate braking forces commensurate with the depression stroke of the brake pedal 11, and if the deceleration Ga is relatively large, the braking force generating mechanisms 14 generate braking forces commensurate with the depressing force applied to the brake pedal 11. Consequently, when the motor vehicle is braked with relatively small deceleration in normal traffic conditions, the braking forces are controlled according to the stroke of depression of the brake pedal 11, and when the motor vehicle is braked with relatively large deceleration in case of emergency, the braking forces are controlled according to the depressing force applied to the brake pedal 11. The braking forces thus produced under adaptive control match the driver's feel, i.e., make the driver feed natural, when the driver brakes the motor vehicle either gradually for small deceleration or abruptly for large deceleration.

In the above embodiment, the parameter for determining the braking forces switches between the depressing stroke of the brake pedal and the depressing force applied to the brake pedal depending on the magnitude of the deceleration of the motor vehicle. However, the parameter may switch depending on the magnitude of the depressing stroke or the depressing force itself as shown in FIGS. 5 and 6.

Figure 5:
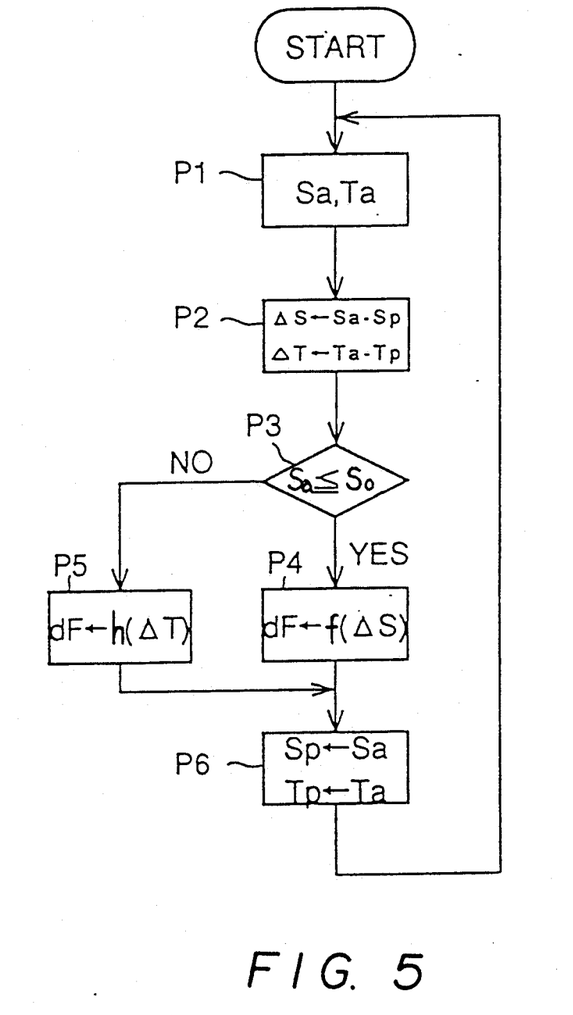
FIGS. 5 and 6 are flowcharts of control sequences according to other embodiments of the present invention.

FIG. 5 shows a control sequence according to another embodiment of the present invention. The flowchart shown in FIG. 5 is similar to the flowchart shown in FIG. 3 except the step P3. In the step P3 shown in FIG. 5, the controller 13 determines whether or not the depressing stroke Sa is of a predetermined value So or less. If the depressing stroke Sa is of the predetermined value So or less, then control goes to the step P4, and if the depressing stroke Sa is larger than the predetermined value So, then control goes to the step P5. Therefore, if the depressing stroke Sa of the brake pedal 11 is relatively small, the braking force generating mechanisms 14 generate braking forces depending on the depressing stroke Sa, and if the depressing stroke Sa of the brake pedal 11 is relatively large, the braking force generating mechanisms 14 generate braking forces depending on the depressing force Ta.

Figure 6:
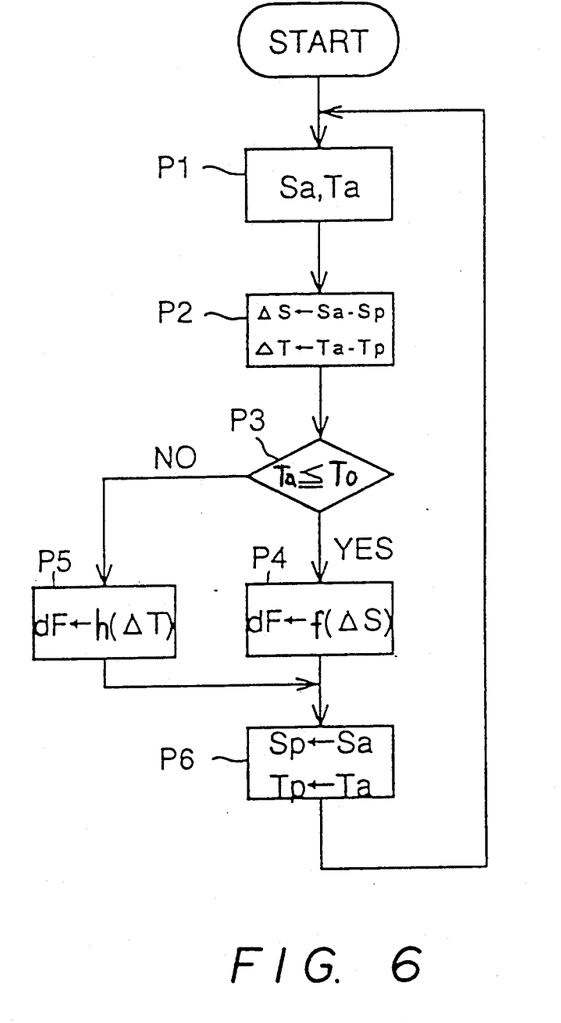

FIG. 6 shows a control sequence according to still another embodiment of the present invention. The flowchart shown in FIG. 6 is similar to the flowchart shown in FIG. 3 except the step P3. In the step P3 shown in FIG. 6, the controller 13 determines whether or not the depressing force Ta is of a predetermined value To or less. If the depressing force Ta is of the predetermined value To or less, then control goes to the step P4, and if the depressing force Ta is larger than the predetermined value To, then control goes to the step P5. Therefore, if the depressing force Ta applied to the brake pedal 11 is relatively small, the braking force generating mechanisms 14 generate braking forces depending on the depressing stroke Sa, and if the depressing force Ta applied to the brake pedal 11 is relatively large, the braking force generating mechanisms 14 generate braking forces depending on the depressing force Ta.

In the illustrated embodiments, each of the braking force generating mechanisms employs an electric motor as an actuator. However, a fluid-pressure brake unit, a pump, or an accumulator may be used as the actuator of a braking force generating mechanism that is mechanically separate from the brake pedal.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

We claim:

1. A brake system for imparting braking forces to road wheels of a motor vehicle, comprising:
    braking command producing means, operable by the driver of the motor vehicle, for producing a braking command to brake the motor vehicle, said braking command comprising a displacement of said braking command producing means and a force applied to said braking command producing means;
    detecting means for detecting both said displacement of sand said force applied to the braking command producing means and generating a signal having components representing both said displacement and said force;

braking force generating means for imparting braking forces to the road wheels of the motor vehicle, said braking force generating means being mechanically separate from said braking command means; and control means for controlling said braking force generating means as a function of said signal from said detecting means.

2. A brake system according to claim 1, wherein said control means comprises means for controlling said braking force generating means based on said displacement if said displacement is not greater than a predetermined value, and for controlling said braking force generating means based on said force if said displacement is greater than said predetermined value.

3. A brake system according to claim 1, further including deceleration detecting means for detecting a deceleration of the motor vehicle and producing a signal representing the detected deceleration, said control means comprising means for controlling said braking force generating means based on said signal from said detecting means and said signal from said deceleration detecting means.

4. A brake system according to claim 3, wherein said control means comprises means for controlling said braking force generating means based on said displacement if said deceleration is not greater than a predetermined value, and for controlling said braking force generating means based on said force if said deceleration is greater than said predetermined value.

5. A brake system for imparting braking forces to road wheels of a motor vehicle, comprising:

braking command producing means, operable by the driver of the motor vehicle, for producing a braking command to brake the motor vehicle, said braking command comprising both a stroke of movement of said braking command producing means and a force applied to said braking command producing means;

a stroke sensor for detecting said stroke of movement of said braking command producing means and producing a stroke signal representing the detected stroke;

a force sensor for detecting said force applied to said braking command producing means and producing a force signal representing the detected force;

braking force generating means for imparting braking forces to the road wheels of the motor vehicle, said braking force generating means being mechanically separate from said braking command means; and control means for selecting one of said stroke signal and said force signal and controlling said braking force generating means based on the selected signal.

6. A brake system according to claim 5, wherein said control means comprises means for determining whether or not said strike is not greater than a predetermined value, and means for controlling said braking force generating means based on said stroke if said stroke is not greater than said predetermined value, and for controlling said braking force generating means based on said force if said stroke is greater than said predetermined value.

7. A brake system according to claim 5, wherein said control means comprises means for determining whether said force is not greater than a predetermined value, and means for controlling said braking force generating means based on said stroke if said force is not greater than said predetermined value, and for controlling said braking force generating means based on said force if said force is greater than said predetermined value.

8. A brake system according to claim 5, further including a declaration sensor for detecting a deceleration of the motor vehicle and producing a signal representing the detected deceleration, said control means comprising means for determining whether the detected deceleration is not greater than a predetermined value.

9. A brake system for imparting braking forces to road wheels of a motor vehicle, comprising:

braking command producing means operable by the driver of the motor vehicle, for producing a braking command into brake the motor vehicle, said braking command comprising a stroke of movement of said braking command producing means and a force applied to said braking command producing means;

an elastomeric element for applying a reactive force to said braking command producing means, said reactive force increasing with the stroke of movement of said braking command producing means at a rate which increases with said stroke;

a stroke sensor for detecting said stroke of movement of said braking command producing means and producing a stroke signal representing the detected stroke;

a force sensor for detecting said force applied to said braking command producing means and producing a force signal representing the detected force;

braking force generating means for imparting braking forces to the road wheels of the motor vehicle, said braking force generating means being mechanically separate from said braking command means; and control means for controlling said braking force generating means based on said stroke signal from said stroke sensor if said braking command is not greater than a predetermined value and for controlling said braking force generating means based on said force signal from said force sensor if said braking command is greater than said predetermined value.

* * * * *